United States Patent
Bergmann et al.

(10) Patent No.: US 9,680,957 B2
(45) Date of Patent: Jun. 13, 2017

(54) ADAPTIVE BANDWIDTH CONSUMPTION OPTIMIZATION FOR WIRELESS DATA CONNECTIONS

(71) Applicant: Harman International Industries, Incorporated, Stamford, CT (US)

(72) Inventors: Carsten Bergmann, San Jose, CA (US); Krishnakumar Subramanian, Fremont, CA (US); Torrey Atcitty, Bluff, UT (US); Rafael Saavedra, Sunnyvale, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 22 days.

(21) Appl. No.: 14/823,901

(22) Filed: Aug. 11, 2015

(65) Prior Publication Data
US 2016/0044129 A1   Feb. 11, 2016

Related U.S. Application Data

(60) Provisional application No. 62/035,918, filed on Aug. 11, 2014.

(51) Int. Cl.
| | | |
|---|---|---|
| *H04L 29/08* | (2006.01) | |
| *H04M 15/00* | (2006.01) | |
| *H04M 1/60* | (2006.01) | |
| *H04W 4/02* | (2009.01) | |
| *H04W 4/04* | (2009.01) | |

(52) U.S. Cl.
CPC ........ *H04L 67/2847* (2013.01); *H04M 15/49* (2013.01); *H04M 15/8088* (2013.01); *H04W 4/02* (2013.01); *H04W 4/028* (2013.01); *H04W 4/046* (2013.01); *H04M 1/6091* (2013.01)

(58) Field of Classification Search
CPC .............. H04L 67/2847; H04M 15/49; H04M 15/8088; H04M 1/6091; H04W 4/02; H04W 4/028; H04W 4/046
See application file for complete search history.

(56) References Cited

U.S. PATENT DOCUMENTS

| | | | | |
|---|---|---|---|---|
| 2008/0244181 A1* | 10/2008 | Walz | ................... | G06F 12/0864 711/121 |
| 2012/0009892 A1* | 1/2012 | Yen | ...................... | H04B 1/1027 455/334 |

\* cited by examiner

*Primary Examiner* — Dinh P Nguyen
(74) *Attorney, Agent, or Firm* — McCoy Russell LLP

(57) ABSTRACT

Embodiments are disclosed for caching multimedia content. An example in-vehicle computing system that adaptively caches multimedia data, the in-vehicle system including a memory, a position sensor, a receiver, and a processor. The position sensor provides a position signal indicative of a present location of the system. The receiver wirelessly receives multimedia data from a remote multimedia data source. The processor stores the received multimedia data in the memory, transfers multimedia data in the memory to a queue for playback when an amount of multimedia data saved in the memory is at least a first threshold value, and adjusts a size of the memory when a wireless communication channel is not available between the system and a remote multimedia data source.

13 Claims, 9 Drawing Sheets

ADAPTIVE BANDWIDTH CONSUMPTION OPTIMIZATION FOR WIRELESS DATA CONNECTIONS

CROSS REFERENCE TO RELATED APPLICATIONS

The present application claims priority to U.S. Provisional Patent Application No. 62/035,918, entitled "ADAPTIVE BANDWIDTH CONSUMPTION OPTIMIZATION FOR WIRELESS DATA CONNECTIONS," and filed on Aug. 11, 2014, the entire contents of which are hereby incorporated by reference for all purposes.

FIELD

The present disclosure relates to the field of wireless multimedia systems, and in particular to a multimedia system such a motor vehicle infotainment system that adaptively controls caching of the wirelessly received multimedia data based upon characteristics of a wireless connection between the wireless multimedia system and a multimedia data source.

BACKGROUND

On-line content is being widely provided to mobile devices, such as for example a mobile phone, smart phone, PDA, or any other device having wireless remote network connectivity. The content may include for example social media, news, weather, traffic, Internet music, Internet radio, audio book services, podcasts, and the like. However, an inherent weakness with an online content especially for a mobile user is that it is reliant on a constant wireless connection to the cloud. This reliance on such an always-connected system is often not practical, since cellular network and Wi-Fi coverage is not ubiquitous, and even the cost of downloading data can become costly for the mobile user.

SUMMARY

Embodiments are enclosed for adaptively caching multimedia data based on current and/or expected communication network connectivity. An example in-vehicle computing system that adaptively caches multimedia data includes a memory; a position sensor that provides a position signal indicative of a present location of the system; a receiver that wirelessly receives multimedia data from a remote multimedia data source; a processor that stores the received multimedia data in the memory, transfers multimedia data in the memory to a queue for playback when an amount of multimedia data saved in the memory is at least a first threshold value and adjusts a size of the memory when a wireless communication is not available between the system and the remote multimedia source. The system further includes wherein, the first threshold value based on the adjusted size of the cache memory; wherein, the processor increases the size of the memory by a first amount when it has been detected, each of a plurality of adjacent sample times, that wireless communication is not available between the system and the remote multimedia data source; wherein the processor decreases the size of the memory by a second amount when a wireless communication channel is available between the system and the remote multimedia data source; and wherein the memory is a cache memory.

An example method for adaptively caching multimedia data includes wirelessly receiving multimedia data from a remote multimedia data source via a communication network; storing the received multimedia data in a memory of a data storage device included in an in-vehicle computing system of a vehicle; transferring the stored multimedia data in the memory to a queue for playback when an amount of the stored multimedia data is at least a first threshold value, the first threshold value based on a size of the cache memory; increasing the size of the memory by a first when a wireless communication channel is not available; maintaining the memory at the increased size when the wireless communication channel is subsequently available and if the amount of stored multimedia data is less than a second threshold value, the second threshold value greater than or equal to the first threshold value; and decreasing the size by a second amount when the amount of stored multimedia data is at the second threshold value. The method further includes determining a present location of the vehicle and providing a position signal indicative thereof; and further includes wherein the memory is a cache memory.

An example in-vehicle infotainment system includes a data storage device including a memory configured to receive multimedia content from an external network via a first communication network; a queue memory configured to receive multimedia data from the memory and deliver the received multimedia data to a user via one or more output devices; a transceiver configured to communicate with a mobile device, the mobile device communicating with the first communication network; one or more sensors; a user input interface configured to receive user input from one or more user input devices; and a processor storing instructions executable by the processor to determine a current location based on output from the one or more sensors; determine a travel route based on a destination input from a user via the one or more input devices; determine a number of white spots along the travel route; determine expected communication network changes along the travel route. The processor may further include instruction to increase a size of the memory by a first amount in response to a first duration before an expected communication network change reaching below a threshold duration; increase the size by a second amount in response to a second duration before arriving at a white spot location reaching below the threshold duration, the second amount greater than the first amount; and decrease the first size by a third amount in response to a number of buffers of the memory increasing above a threshold number. The system further includes wherein the memory is a cache memory.

It is to be understood that the features mentioned above and those to be explained below can be used not only in the respective combinations indicated, but also in other combinations or in isolation.

These and other objects, features and advantages of the invention will become apparent in light of the detailed description of the embodiment thereof, as illustrated in the accompanying drawings.

BRIEF DESCRIPTION OF THE DRAWINGS

The foregoing and other features of embodiments will become more apparent from the following detailed description of non-limiting embodiments when read in conjunction with the accompanying drawings. In the drawings, like or identical reference numerals refer to like or identical elements.

DETAILED DESCRIPTION

As described above, online multimedia solutions for a mobile user relies on a constant wireless network connectivity (e.g., via a cellular network or a Wi-Fi network) to a remote multimedia data source. However, wireless network connectivity is not ubiquitous and may change with location. For example, wireless white spots include areas where wireless (e.g., cellular or Wi-Fi) network coverage is not available and/or is below a threshold performance parameter (e.g., signal strength, available bandwidth/throughput rate, etc.). Further, even when wireless connection is available, wireless network parameters (e.g. cost, bandwidth) may change. Adaptively caching multimedia content ahead of time based on travel route and expected network changes along the travel route may increase tolerance to wireless white spots (that is, areas that do not have cellular or Wi-Fi access) and network changes, thereby improving continuity of multimedia experience to a user at low cost. In order to perform more intelligent caching of multimedia data that provides for a more efficient use of resources, the present disclosure describes a vehicle infotainment system that communicates via a wireless data network to increase tolerance to wireless white spots.

Figure 1:
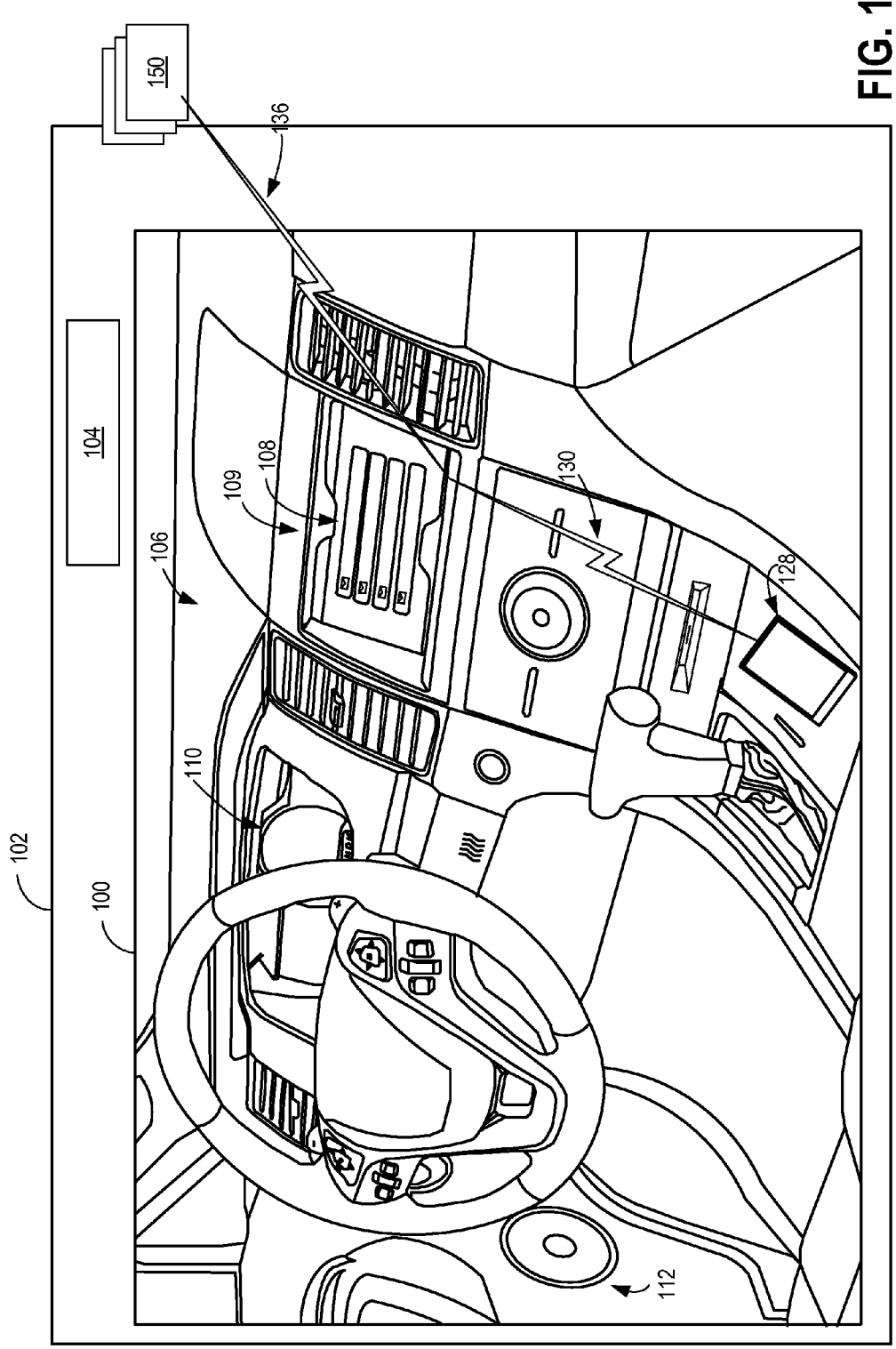
FIG. 1 shows an example interior view of a cabin of a vehicle including an in-vehicle computing system in accordance with one or more embodiments of the present disclosure.

FIG. 1 shows an example partial view of one type of environment for a navigation system that caches wireless white spot data: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150. In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
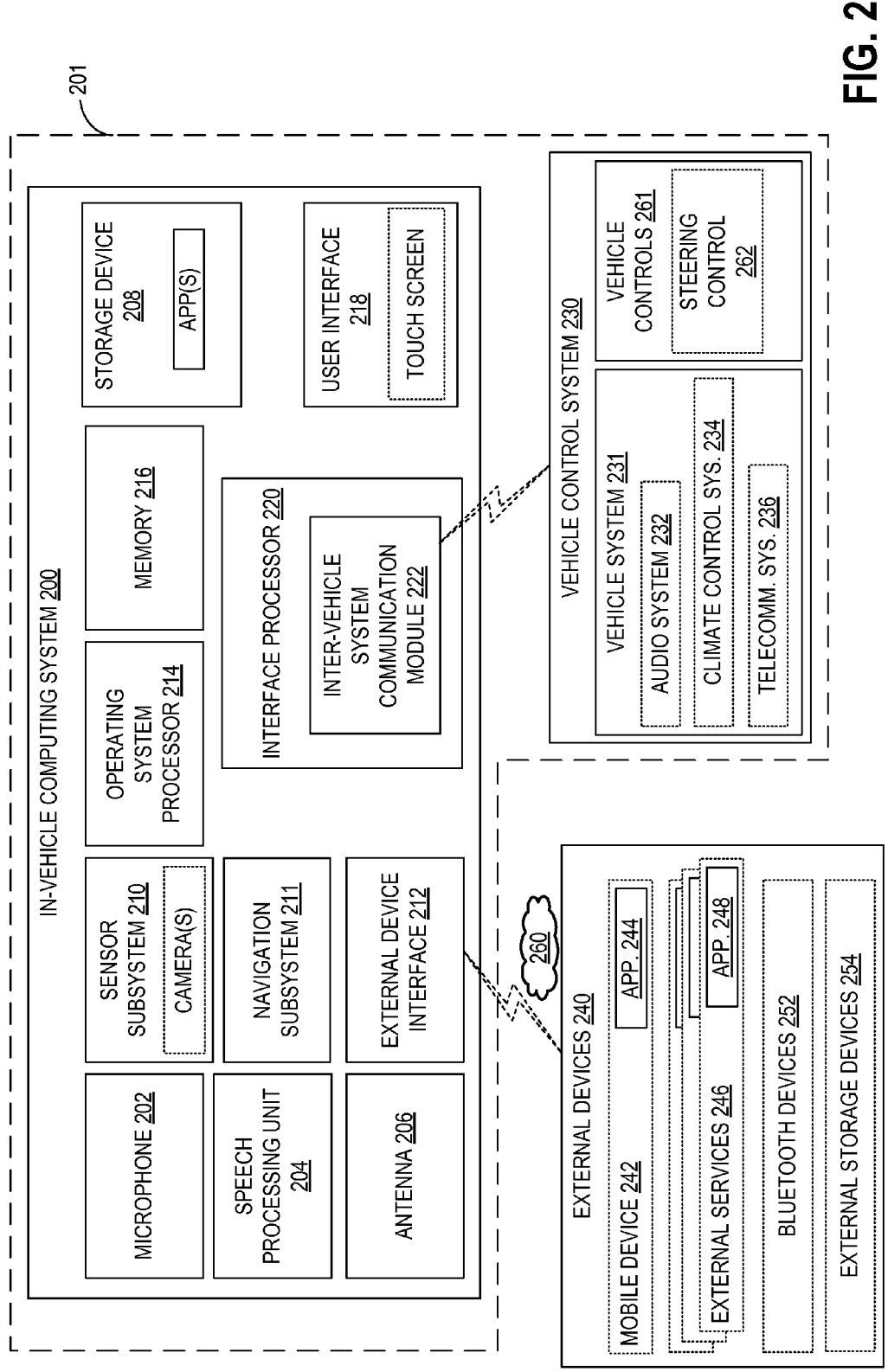
FIG. 2 shows a block diagram of an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

The navigation sub-system may include and/or receive sensor data from a plurality of sensors (e.g., in sensor subsystem 210) including one or more position sensors for determining a current position and/or location of the navigation sub-system and relay the position information to processor 214. In one example, the position sensors may communicate with a navigation processor which may communicate with processor 214. The one or more position sensors may include one or more of linear position sensors, angular position sensors, and multi-axis position sensors. Some examples of position sensors include capacitive transducer, capacitive displacement sensor, eddy-current sensor, GPS receiver, accelerometer, etc. A current location of the navigation system may be determined based on the output of the position sensors, for example. The position sensors may additionally or alternatively receive position information from processor 214. As such, processor 214 may communicate bi-directionally with the position sensors. Said another way, the processor may receive the position input from the position sensors. In example situations wherein there is no wireless coverage, or the position sensor is unable to determine the position, the processor may be able to retrieve a location information stored in a map memory, for example, and transmit the location data to the position sensor.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct, as described in more detail below.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Figure 3:
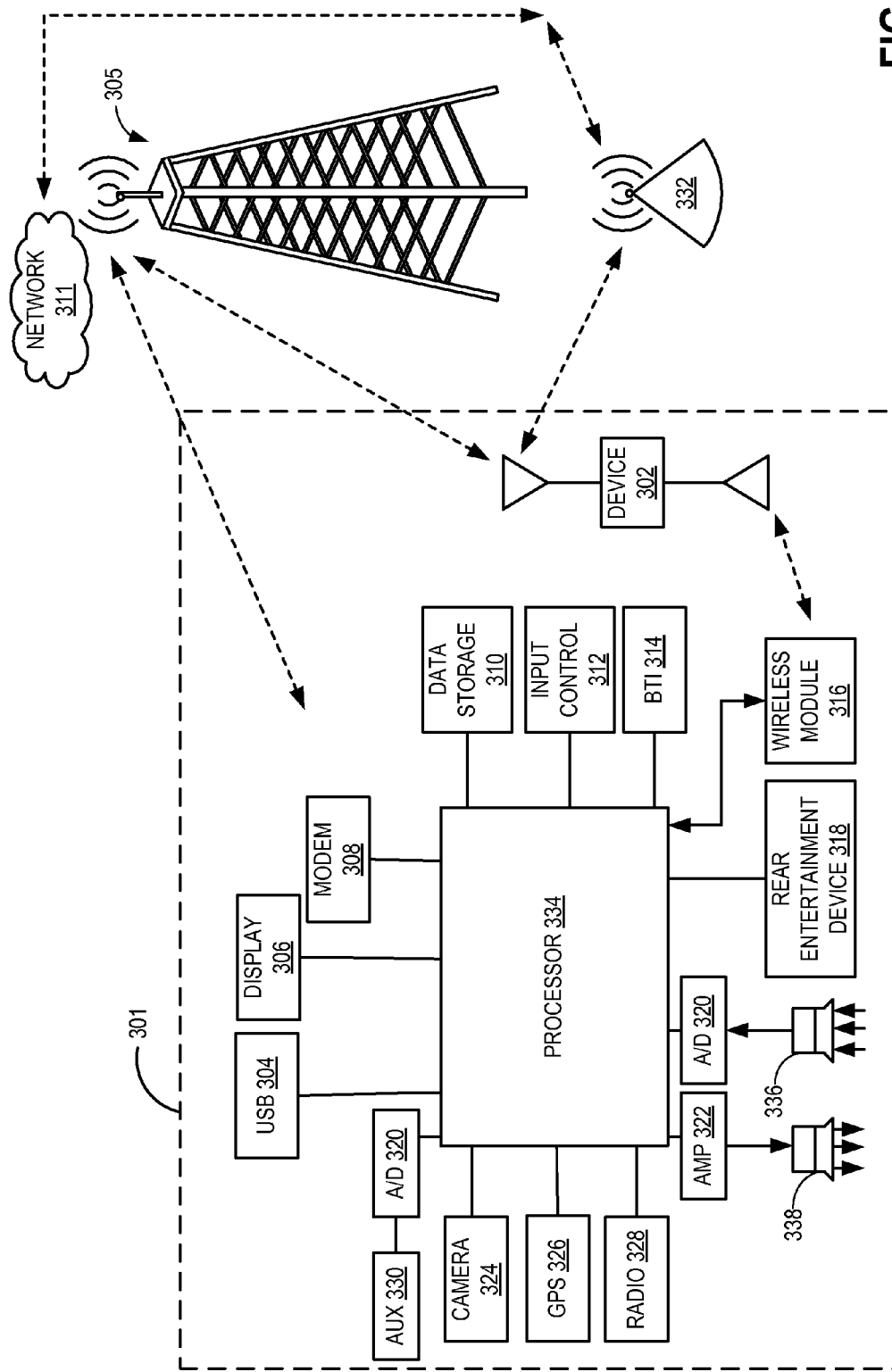
FIG. 3 shows a block diagram illustration of an example in-vehicle infotainment computing system that communicates with a nomadic device and with a data network in accordance with one or more embodiments of the present disclosure.

FIG. 3 shows a block diagram of an example in-vehicle computing system 301 configured and/or integrated inside a vehicle, such as vehicle 201 of FIG. 2. In-vehicle computing system 301 may be an example of in-vehicle computing system 200 of FIG. 2 and may be configured as an in-vehicle infotainment computing system, as discussed at FIG. 2, to provide information-based media content such as audio and/or visual media content, including entertainment content, navigational services, etc., in order to enhance an in-vehicle experience for one or more users (e.g., a driver and/or one or more passengers). Specifically, the in-vehicle computing system may be configured to provide uninterrupted multimedia experience to the user(s). Further, in-vehicle computing system 301 may perform one or more methods (e.g., as presented in FIGS. 6-8) described herein in some embodiments.

In-vehicle computing system 301 may include a processor 334 that controls at least some portion of the in-vehicle computing system 301 and provides on-board processing of controls and commands received by in-vehicle computing system 301. Data that may be received and processed by the processor 334 may be stored in a data storage unit 310. Data storage unit 310 may include non-persistent or volatile memory, such as (and without limitation) random access memory (RAM), and persistent or non-volatile memory, such as (and without limitation) a hard disk drive (HDD) or flash memory.

In-vehicle computing system 301 may also include a visual front end interface, such as a display 306, located in the vehicle. Display 306 may be an LCD display or a graphical display. In some embodiments, the interface may have a touch sensitive screen. In additional or alternative embodiments, the interaction with the in-vehicle computing system 301 may occur through button presses, audible speech, and/or speech synthesis and be displayed on the display 306.

In-vehicle computing system 301 may also be provided with a number of different inputs through which the user can interface or interact with in-vehicle computing system 301. For example, the in-vehicle computing system may include a microphone 336, an auxiliary input (AUX) 330, a USB input 304, a GPS input 326, and/or a BLUETOOTH™ transceiver (BTT) 314. An input control 312 may also be included in the in-vehicle computing system to allow a user to swap between various inputs.

Signals passing from the auxiliary input 330 and the microphone 336 may pass through one or more analog-to-digital (A/D) converters 320 before being passed to the processor 334 and vice-versa. For purposes of clarity, two A/D converters are shown. However, the microphone 336 and the auxiliary input 330 may share a single A/D converter.

Additional inputs to the processor 334 may include one or more vehicle cameras 324. The vehicle cameras may be front or rear view cameras and/or in the vehicle. The output of the camera may be presented on the display 306 and/or one or more rear-entertainment device(s) 318. Additional inputs may include one or more radios 328 (e.g., AM/FM radio, satellite radio, etc.) and one or more rear entertainment devices 318. The output from the radio may be transmitted from one or more in-vehicle speakers 338. The rear entertainment device 318 may include one or more media players (e.g., a DVD player) and one or more displays visible to rear seat passengers from which video, picture and/or audio may be output.

Outputs from the system may include, but are not limited to, display 306, one or more speakers 338 and/or one or more rear entertainment devices 318 having a rear display(s). The speaker may be connected to an amplifier 322 and may receive its signal from the processor 334 through a digital-to-analog converter (not shown).

The vehicle may include an on-board modem 308 for two-way communication of data and message between in-vehicle computing system 301 and an external network 311. As a non-limiting example, the modem 308 may be a USB cellular modem. In some embodiments, the modem may be an embedded modem. The data and messages may be exchanged by communicating with the one or more cellular towers 305.

Additionally or alternatively, in-vehicle computing system 301 may use BLUETOOTH transceiver 314 to communicate with a user's mobile (sometimes referred to as "nomadic" or "portable") device 302 (e.g., mobile phone, smart phone, PDA, or any other device having wireless remote network connectivity). Mobile device 302 may be an example of mobile device 242 at FIG. 2. Connectivity may also be provided using a wireless connection such as for example a USB connection linking mobile device 302 with in-vehicle computing system 301. This connection may be enabled using an accessory protocol (as non-limiting example, the iPHONE™ accessory protocol or the ANDROID™ accessory protocol). Using mobile device 302, communication with the external network 311 may be accomplished through, for example, communication with the cellular tower 305 and/or a wireless access point 332. Data may be communicated from the vehicle (e.g., from the processor 334) to network 311 utilizing, for example, a data-plan, data over voice, or DTMF tones associated with mobile device 302. In some embodiments, pairing mobile device 302 and BLUETOOTH transceiver 314 may be instructed through one or more buttons or similar input (not shown). The one or more buttons may be one or more hard keys located in the vicinity of the vehicle driver and/or one or more soft keys shown on display 306. The soft keys may or may not be touch-sensitive (e.g., actuatable/selectable via input to a touchscreen display). Additionally or alternatively, the soft keys may be one or more physical buttons mapped to the one or more soft keys.

Additionally or alternatively, in-vehicle computing system 301 may be outfitted with one or more wireless modules 316 for wireless communication with network 311. A non-limiting example of such a wireless communication is any communication meeting the 802.11 IEEE standards such as Wi-Fi or WiMAX. To communicate with network 311, a connection may be made to wireless access point 332 which may be in the vehicle or outside and remote from the vehicle (e.g., and without limitation, at a publically available hotspot venue). For purposes of simplicity and clarity, FIG. 3 shows an external hotspot.

Processor 334 may be provided with an operating system including an API to communicate with modem application software. The modem application software may access an embedded module or firmware on the BLUETOOTH transceiver 314 to complete wireless communication with a remote BLUETOOTH transceiver (such as that found in mobile device 302). It is to be understood that references to BLUETOOTH communication, transceivers, and other elements are provided for illustrative purposes and such disclosure may also be understood to provide support for using/including other wireless and/or proximity-based communication and related elements.

Mobile device 302 may be capable of voice band and/or broadband data communication. A user may be able to transfer data over the voice band using a technique called frequency division multiplexing. Thus, a user of the nomadic device may be able to talk over the device while data is being transferred. If the user has a data plan associated with the nomadic device, broadband transmission may be possible.

Incoming data to the VICS 12 may be passed through the mobile device via a data-over-voice or data plan through the onboard BLUETOOTH transceiver 314 and into processor 334. Alternatively, the data may be passed through modem 308 via cellular communication to processor 334. Alternatively, the data may be passed through the wireless module 316 via a broadband connection to the processor 334. Data may be stored in data storage unit 310 of in-vehicle computing system 301.

Additional sources that may interface with in-vehicle computing system 301 include personal navigation device, vehicle navigation device, onboard GPS devices, and/or remote navigation systems having connectivity to network 311. Further, processor 334 may be in communication with a variety of other auxiliary devices connected through a wireless or wired connection. Auxiliary devices may include, but are not limited to, personal media players, wireless health devices, portable computers, and the like.

To download content, software may be downloaded and stored in cache of the data storage unit 310 of in-vehicle computing system 301 and/or on mobile device 302, such as for example a mobile phone. If downloaded to mobile device 302, the software may be controlled via in-vehicle computing system 301, and a graphical user interface (GUI) of the software displayed on in-vehicle computing system 301, when the software is being used in the vehicle. However, operation and processing may simultaneously and/or alternatively occur on mobile device 302. In some embodiments, the operation and processing may be performed on mobile device 302 and in-vehicle computing system 301 in a coordinated manner (e.g., redundantly and/or in some configuration of divided labor.

In some embodiments, the software may be a mobile application. The software may be part of an application enabling download of content such as for example from an Internet radio source. For example, the software may be a content-serving application providing access to multiple services or applications such as services found on the Web. The Internet radio application may be one service offered through this application. A non-limiting example of such an application is one developed by HARMAN INTERNATIONAL INDUSTRIES as AHA RADIO. As used herein, the term "download," and variations thereof, as applicable, refers to the transmission of content including, but not limited to, content download and streaming.

Figure 4:
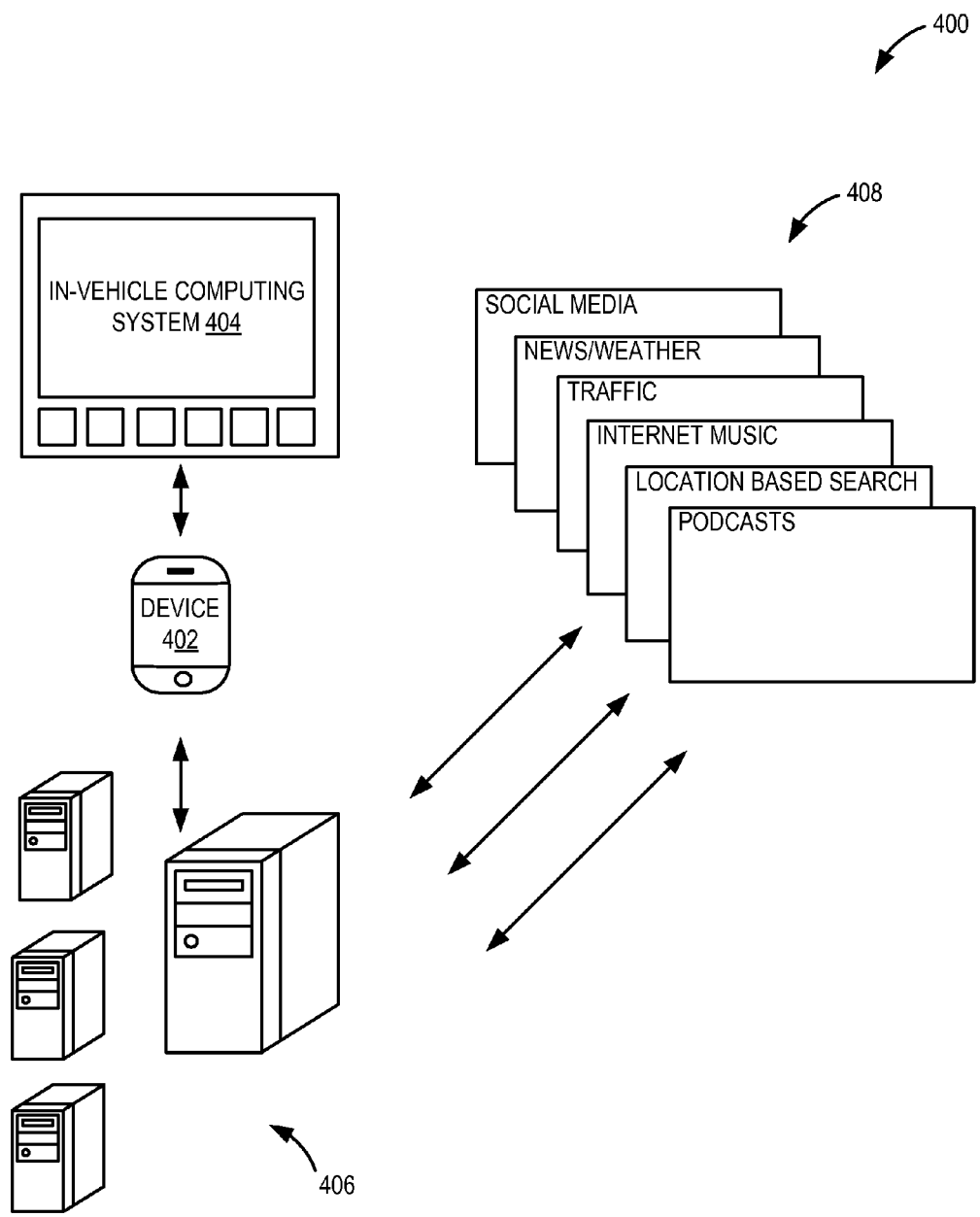
FIG. 4 illustrates an example system for rendering one or more infotainment services from a remote multimedia data source to an in-vehicle computing system via a mobile device connected to a communication channel in accordance with one or more embodiments of the present disclosure.

FIG. 4 illustrates an example system architecture for rendering one or more infotainment services to an in-vehicle computing system 404 via a mobile device 402. Mobile device 402 may be an example of mobile device 302 of FIG. 3. In-vehicle computing system 404 may be an example of in-vehicle computing system 301 of FIG. 3. One or more applets may be stored and executing on in-vehicle computing system 404, which provides instructions to and controls an application (e.g., a content-serving application) on mobile device 402. For example, mobile device 402 may include one or more content-serving applications communicating with one or more applets on the VICS 12 to serve Internet-based content 408 on to the in-vehicle computing system. The content-serving application(s) may exchange data and commands from the Internet-based services to the in-vehicle computing system, and vice-versa, using a single protocol. In one embodiment, the protocol may be a binary protocol.

Mobile device 402 may communicate with one or more servers 406. One or more servers 406 may be located remotely from a vehicle (such as vehicle 102 of FIG. 1) including in-vehicle computing system 404 and/or mobile device 402 using a network connection such as a cellular or other wireless connection. In some embodiments, the communication may be an Internet communication. The servers may be said to be operating in "the cloud." Data may be exchanged between mobile device 402 and server(s) 406 using a single protocol. Non-limiting examples include JSON, XML, or SOAP.

One or more clients for the Internet-based content 408 may be stored and executed on the server(s). The content-serving application on mobile device 402 may interact with the Internet-based content via messages passing through server(s) 406 over a network (such as network 311 at FIG. 3). In one embodiment, the interaction may be through the World Wide Web (WWW). Non-limiting examples of the Internet-based content may include social media, news, weather, traffic, Internet music, Internet radio, audio book services, podcasts, and the like. Although not limiting, the various embodiments are described with respect to the use of Internet radio.

Figure 5:
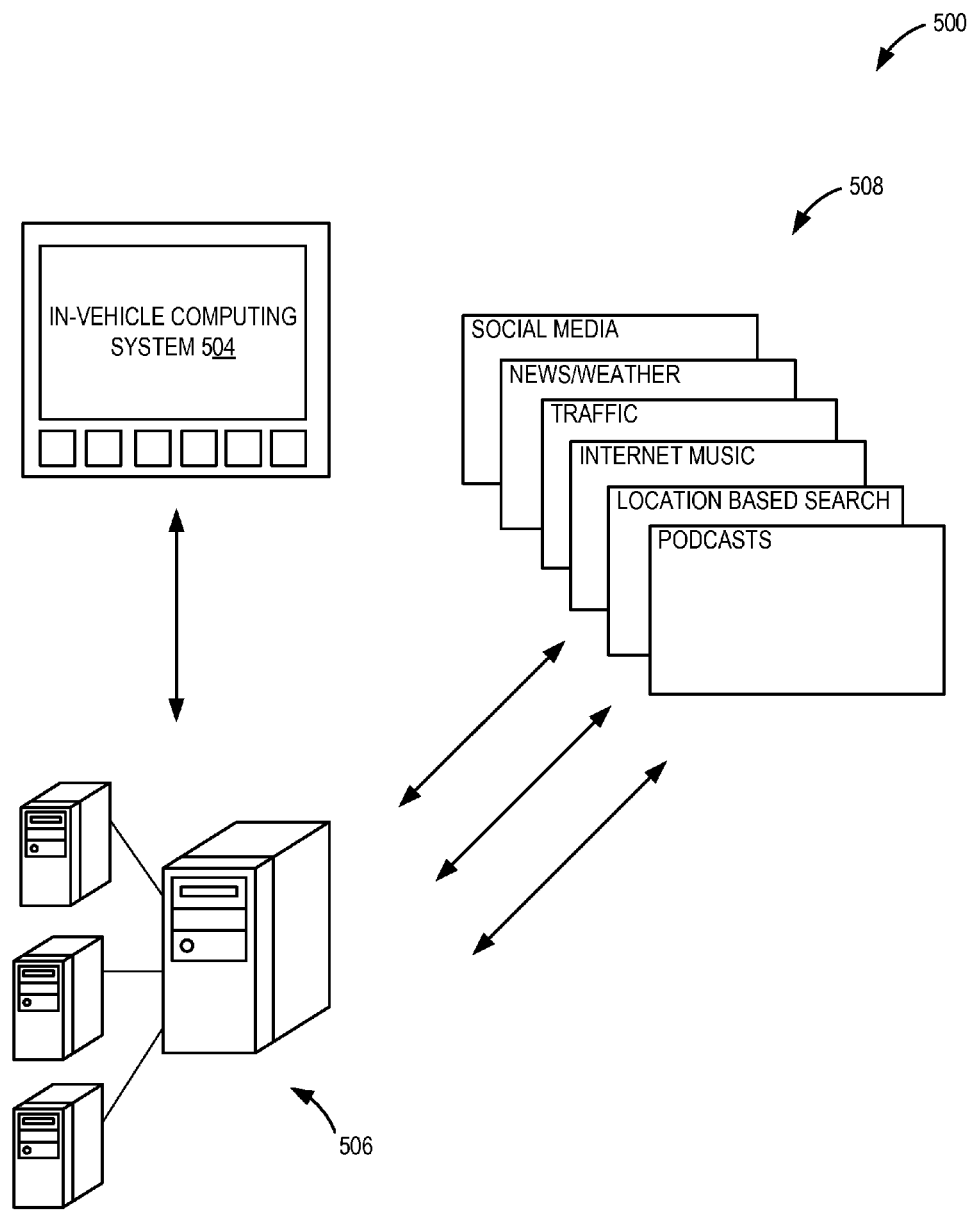
FIG. 5 illustrates an example system for rendering one or more infotainment services from a remote multimedia data source to an in-vehicle computing system via a communication channel in accordance with one or more embodiments of the present disclosure.

FIG. 5 illustrates an example system architecture for rendering one or more infotainment services to an in-vehicle computing system 504 via a content-serving application running on the in-vehicle computing system. In-vehicle computing system 504 may be an example of in-vehicle computing system 301 of FIG. 3. In this embodiment, a direct communication between in-vehicle computing system 504 and one or more server(s) 506 may exist. The communication may be a wireless communication, and in some embodiment, a wireless communication over the Internet. Messages may be exchanged between the VICS 12 and server(s) 506 using a single protocol. As non-limiting examples, the protocol may be JSON, XML, or SOAP. In some embodiments, a software development kit (SDK) may be used to develop and enable the connection capabilities between an embedded communication module in the vehicle and the Internet.

One or more clients for one or more Internet-based contents 508 may be stored and executed on one or more server(s) 506. The content-serving application may interact with Internet-based content 508 via messages passing through server(s) over the Internet. In one embodiment, the interaction may be through the World Wide Web (WWW). Non-limiting examples of the Internet-based content may include social media, news, weather, traffic, Internet music, Internet radio, audio book services, podcasts, and the like. Although not limiting, the various embodiments are described with respect to the use of Internet radio.

In one example system, one or more mobile devices may be connected to the in-vehicle computing system 504, wherein one or more infotainment services may be delivered to each mobile device via a content-serving application running on the in-vehicle computing system. In this embodiment, a direct communication between the in-vehicle computing system and one or more server(s) may exist. When one or more users are communicating with the in-vehicle computing system via one or more mobile devices, the cache included in the in-vehicle computing system may be shared among the users. Accordingly, when the cache size is increased (in response to vehicle operation in a white spot, and/or in response to an expected network change or white spot, for example), cache memory allocated to each user may be increased. In one example, the increase in cache memory size may be equal for each user and/or predetermined for all conditions. In other examples, the increase may be based on user demand.

In one example, a processor (such as processor 334 of FIG. 3) within an in-vehicle computing system (such as in-vehicle computing system 301 of FIG. 3) and/or a mobile device (such as mobile device 302 of FIG. 3) may be configured to detect and monitor available network connections and their capabilities, and select an appropriate connection. Once selected, content richness (e.g., bit rate selection, image resolution, and various templates such as low/medium/high), buffering, and pre-loading/caching behavior of an application in context of the available network capabilities and data rate costs may be adapted. When a vehicle is in motion, the application executing on the processor of the in-vehicle computing system or the mobile device may adjust multimedia downloading behavior and cache behavior prior to changes in the network quality and/or availability, based on the location, travel routes, and learned behavior predicting network coverage along common routes. For example, the application may detect that it is advantageous to proactively pre-cache content when high bandwidth/low cost network is available because, for example, of poor network coverage or cost. In the context of Internet radio, this may be done based on learned listening patterns (e.g., what the user will most likely listen to in the near future, given time of day, day of week or location, a preferred playlist, etc.).

In one example, a cache size may be adjusted based on weight assigned to one or more current network parameters and to corresponding one or more expected network parameters. For example, a first weighted average of parameters of a current communication network including current bandwidth and current network rate cost may be determined; a second weighted average of parameters of an expected communication network including expected bandwidth and expected cost may be determined; and a cache size of the in-vehicle computing system and/or the mobile device may be adjusted based on the first weighted average and the second weighted average. For example, a higher bandwidth may be assigned greater weight with respect to a lower bandwidth; a lower cost may be assigned greater weight than a higher cost network; and greater weight may be assigned to bandwidth than cost. Accordingly, when a network change is expected from a first network with low cost, high bandwidth to a second network with same low cost but lower bandwidth, a weighted average of the first network may be greater than the weighted average of the second network. Consequently, the cache size may be increased and the amount of increase may be based on a difference between the first weighted average and the second weighted average.

Similarly, when a network change is expected from a third network with low cost, high bandwidth to a fourth network with higher cost but same high bandwidth, a weighted average of the third network may be greater than the weighted average of the fourth network. Consequently, the cache size may be increased and the amount of increase may be based on a difference between the third weighted average and the fourth weighted average. Further, when a network change is expected from a fifth network with low cost and low bandwidth to a sixth network with higher cost and higher bandwidth, a fifth weighted average of the fifth network may be greater than the sixth weighted average of the sixth network as more weight is given to lower cost than higher bandwidth. In this way, preference may be given to cache more multimedia data when operating within a lower cost network and/or higher bandwidth network. Further, in some examples, if assigning more weight to lower cost network over higher bandwidth network may cause an interruption in user experience, weight assigned to the higher bandwidth network may be adjusted (increased) and playback cache size adjusted accordingly. In some other examples, the weight may be adjusted based on user preference. In another example, the cache size may be adjusted based on a confidence value of current versus expected network connectivity.

The processor or the mobile device may include a wireless white spot finder unit which, based upon the current location and a destination when specified, requests additional content from the server-side based upon the location of known white spots. For example, cellular white spots include locations that do not have cellular data coverage, and this network coverage information is available from cellular companies (e.g., in the United States AT&T, Verizon, or T-Mobile). In addition, for the white spot locations, cellular and Wi-Fi, may be learned based upon the operational experience of the in-vehicle computing system or the mobile device. When a destination is known to the in-vehicle computing system or the mobile device, then the white spot finder unit may also use this information, in addition to the current location, to determine what white spot(s) are along the route and then request additional content that may be cached for playback even in the white spots along the route. Even when a destination is not known to the in-vehicle computing system or the mobile device, based upon the current location of the in-vehicle computing system or the mobile device and the white spot locations known to the in-vehicle computing system or the mobile device, the white spot finder location unit may provide additional content for storage in the cache of a data storage unit (such as data storage unit 310 of FIG. 3) included in the in-vehicle computing system or in a cache of a second data storage unit included in the mobile device. This ensures that even when the in-vehicle computing system or the mobile device is travelling in a white spot additional content is available to reduce the chance of interfering with the user's listening experience.

When a destination has not been specified to navigation device within the in-vehicle computing system or the mobile device, then the device may use stored data indicative of previous trips to determine the likely route along which the in-vehicle computing system or the mobile device may travel. For example, a user may not specify a destination when travelling along a regular morning commute route, but based upon the starting location (e.g., a home location), day and time of day, the in-vehicle computing system or the mobile device may determine that it is probable that the travel will be along a regular morning commute route to a known destination. If the regular commute route does not contain any known white spots, but adjacent locations do, the in-vehicle computing system or the mobile device may still download a smaller set of data associated with only a few white spot locations around the current location, if any, since it is likely that the travel will progress along the regular commuting route with known good connectively. Similarly if a destination is not known to the in-vehicle computing system or the mobile device, or the in-vehicle computing system or the mobile device does not have confidence that a known route is probable based upon factors such as starting location, day, time of day, et cetera, then the in-vehicle computing system or the mobile device may increase the size of the cache to ensure the device has the increased amount of available playback data before the device enters the white spot.

The in-vehicle computing system or the mobile device may execute an application that intelligently varies the amount of playback data that is cached based upon wireless white spots (e.g., cellular and Wi-Fi), thus ensuring that the user has more content for playback while in the white spot to increase the likelihood of an uninterrupted listening experience. The wireless white spots may be provided for example from a database of known cellular white spots, or for example empirically determined by the in-vehicle computing system or the mobile device monitoring the cellular and Wi-Fi white spots during the travel of the VICS or the nomadic device.

As an example, the multimedia playback cache may be N (e.g., 128) buffers each of size M (e.g., 2048) bytes for storing streaming data from a source, such as an Internet radio. The playback cache may be located in a data storage unit (such as, data storage unit 310 at FIG. 3) or in the mobile device, and may be logically configured for example as a circular buffer. The in-vehicle computing system or the mobile device may execute an application that monitors and adaptively adjusts the size of the playback cache (e.g., number/size of buffers) based upon wireless network availability. In one example, if the in-vehicle computing system is directly communicating with the external network, a playback cache size of the in-vehicle computing system may be increased. In another example, if the in-vehicle computing system is communicating with the external network via the mobile device, the playback cache size of the in-vehicle computing system and/or a cache size of the mobile device may be increased. In still another example, when the vehicle is in motion, if the in-vehicle computing system detects that a network change (e.g., to higher cost and/or lower bandwidth) or a white spot is expected to be encountered prior to the mobile device detecting the expected change or white spot, the playback cache size of the in-vehicle computing system may be increased. Simultaneously or subsequently, the in-vehicle computing system may communicate the detected information to the mobile device, in response to which the cache size of the mobile device may be increased. Similarly, if the expected change or the white spot is detected by the mobile device prior to the detection by the in-vehicle computing system, the cache size of the mobile device may be increased and then the playback cache size of the in-vehicle computing system may be increased.

Figure 6:
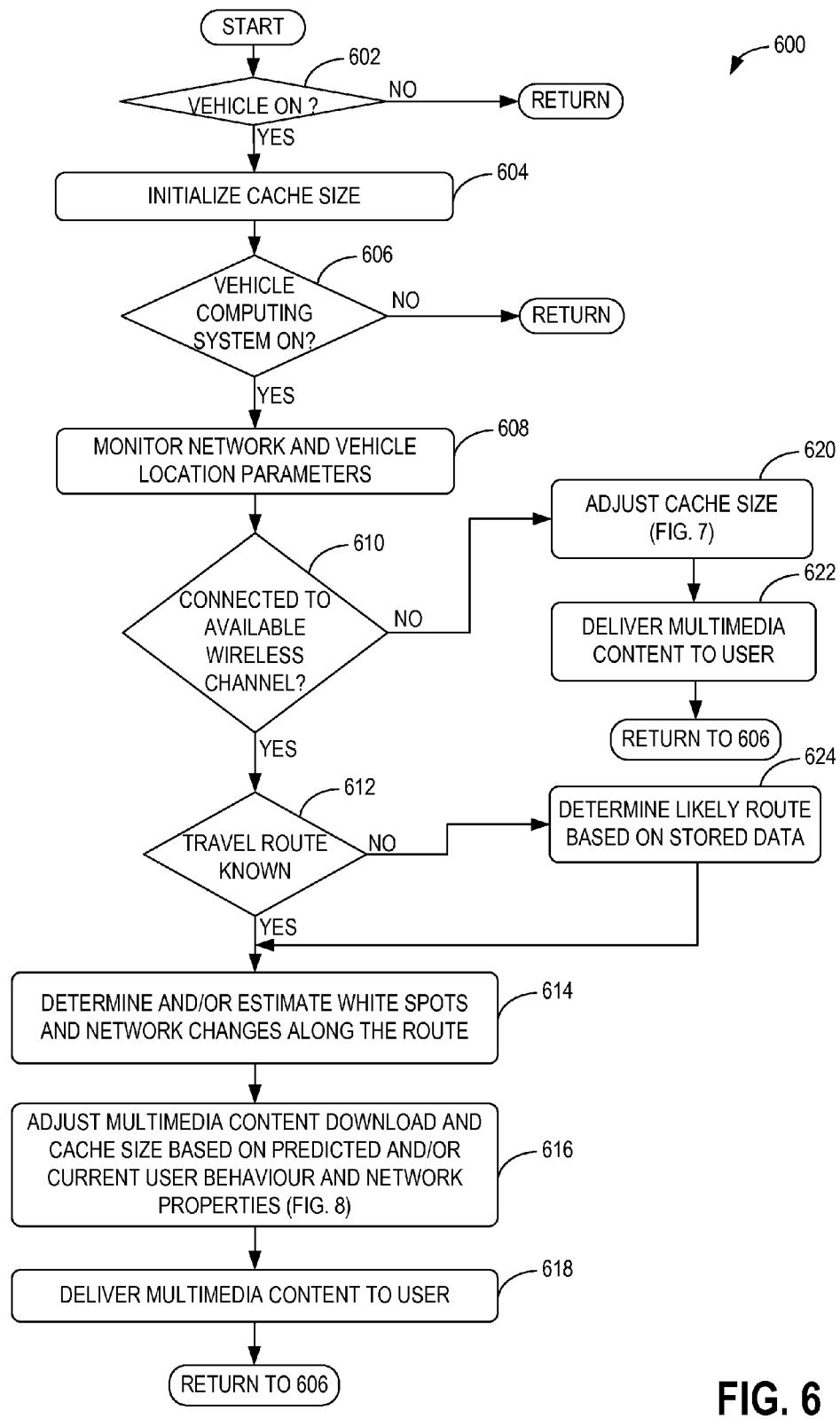
FIG. 6 shows a flow chart illustrating an example method for adapting cache memory for continuous multimedia playback to a user within a vehicle in accordance with one or more embodiments of the present disclosure.

Turning to FIG. 6, a flowchart illustrating an example method 600 for delivering multimedia content to a user is shown. Specifically, method 600 relates to dynamically adjusting a cache size of one or more data storage devices and/or one or more multimedia download parameters of internet-based content downloaded via an in-vehicle computing system (such as in-vehicle computing system 301 at FIG. 3) or a mobile device (such as mobile device 302 at FIG. 3) based on predicted and current wireless communication network parameters in order to provide uninterrupted multimedia experience to a user within a vehicle in motion. The one or more data storage devices may include a first data storage device included within the in-vehicle computing system (such as data storage device 310 at FIG. 3) and a second data storage device included within the mobile device. Method 600 will be described herein with reference to the components and systems depicted in FIG. 3, though it should be understood that the method may be applied to other systems without departing from the scope of this disclosure. Instructions for carrying out method 600 may be executed by an operating system processor, such as processor 334 at FIG. 3, based on instructions stored on a memory of the processor and in conjunction with signals received from sensors and/or control systems of the vehicle system, such as the sensors and control systems described above with reference to FIGS. 1-3. Additionally or alternatively, the signals may be received from sensors and/or control systems of the mobile device. In some examples, the instructions for carrying out method 600 may be executed by a processor within the mobile device based on instructions stored on a memory of the processor and in conjunction with signals received from sensors and/or control systems of the vehicle system and/or the mobile device.

Method 600 begins at 602. At 602, method 600 includes confirming if the vehicle is powered on. A vehicle-on condition may be confirmed based on a key-on condition (e.g., a key being inserted and/or turned to an "on" position in an ignition of the vehicle) where the vehicle includes an active key, a start button actuated condition where the vehicle includes an ignition start/stop button, and a passive key being within a threshold distance of the vehicle where the vehicle includes a passive key. If the vehicle is not powered on (answer at 602 is NO), method 600 may return to wait for a vehicle on signal. If it is confirmed that the vehicle is on (answer at 602 is YES), method 600 proceeds to 604. At 604, method 600 includes initializing a cache size. For example, a predetermined amount of memory may be allocated to the cache within the data storage device when the vehicle is turned on. Allocating a predetermined amount of memory to cache may include allocating a number of buffers (e.g. N number of buffers), each buffer of a predetermined size (e.g., 1 Mbyte). In one example, the cache may be initialized to the same value every time the vehicle is turned on. In another example, the cache initialization value may be adjusted based on wireless network connectivity during a latest vehicle off event. For example, if the vehicle is in a white spot when the vehicle was last turned off, at a next vehicle on event, the cache initialization value may be increased (that is, more memory may be allocated to the cache than during the prior vehicle-on event).

Upon initializing the cache size, method 600 proceeds to 606. At 606, method 600 includes confirming if the in-vehicle computing system is on. An in-vehicle computing system on condition may be confirmed based on an in-vehicle computing system button actuated condition. In some examples, the in-vehicle computing system on condition may be confirmed based on a value of a status flag stored in a memory of the in-vehicle computing system. In some other examples, the in-vehicle computing system may be automatically turned on when the vehicle is turned ON.

If the in-vehicle computing system is not on (answer at 606 is NO), method 600 may return to wait for an in-vehicle computing system-on signal.

Upon confirming that the in-vehicle computing system is turned on, method 600 proceeds to 608. At 608, method 600 includes monitoring network parameters and vehicle location parameters. Monitoring network parameters may include, for example, monitoring of the status of the various wireless receiver interfaces. Network parameters may include connectivity to an external network (such as network 311 at FIG. 3), signal strength or bandwidth of a communicating network (cellular or wireless), data download rate from the external network, etc. Vehicle location parameters may include a current position of the vehicle or the mobile device within the vehicle, destination, travel route, etc.

Next, at 610 method 600 includes confirming if the vehicle or the mobile device is connected to an available wireless communication channel. For example, the communication channel may be a local WiFi or WiMax network communication channel or a cellular network communication channel. In one example, the vehicle may be directly connected to the wireless communication channel as shown in FIG. 5. In another example, the vehicle may be connected to a mobile device that is connected to the wireless communication channel as shown in FIG. 4.

If it is confirmed that the vehicle is not connected to the communication channel, the method proceeds to 620. At 620, method includes adjusting a memory size of multimedia playback cache (also referred to herein as playback cache or cache). For example, the playback cache size may be incremented when the vehicle is not connected to the communication channel. Details of adjusting the playback cache size when the vehicle is not connected to the communication channel will be further elaborated with respect to FIG. 7. Upon adjusting the cache size, method 600 proceeds to 622. At 622, method 600 includes delivering multimedia content stored in the cache. For example, multimedia content stored in the cache may be pushed to a queue buffer within the in-vehicle computing system. The multimedia content may then be delivered to the user from the queue buffer via one or more outputs of devices controlled by the in-vehicle computing system such as via a display, one or more speakers, and/or one or more rear entertainment devices having a rear display(s) within the vehicle. Method 600 then returns to 606 to continue to monitor the status of the vehicle computing system and vehicle parameters/conditions.

Returning to 610, if it is confirmed that the vehicle is connected to the communication channel, method 600 proceeds to 612. At 612, method 600 includes determining if a travel route of the vehicle is known based on a destination input by a user. In one example, the user may input the destination using a touchpad of the navigation system. Specifically, the input destination may be received by a positioning unit of the processor. In addition, the positioning unit may also receive the current location based on the output of one or more of the position sensors. A map matching unit may receive the position data from the positioning unit and further align the navigation system with reference to the road network, for example. This aligned position may then be transmitted to the positioning unit. In some examples, the current location may additionally or alternatively be input by the user using the plurality of input/output devices. As such, the route map may be generated using navigation algorithms based on a cartographic database, for example.

If the answer at 612 is YES, the travel route is known based on user input destination, and method 600 proceeds to 614. In the answer at 612 is NO, then the travel route is not known based on user input destination, and method 600 proceeds to 624, where a likely route may be determined based on previously stored map data and previous vehicle travel data. For example, based on the current location, day, time of day, date, etc., the navigation system may intelligently determine a route that is most likely to be travelled based on previously generated map data history, user preferences, and/or other available data.

Upon determining the known route or the likely route, method 600 proceeds to 614. At 614, method 600 includes mapping white spots and network changes along the route. As described above, the white spots may include locations that do not have cellular data coverage or locations where the wireless connectivity or wireless signal strength is below a threshold (−90 dBm, for example). Further, at 614, method 600 may include determining white spot map data. The white spot map data may include the white spots (e.g., a location/boundary of the white spots, parameters, such as signal strength, of the white spots, etc.) combined with the route map (e.g., mapped to locations on the route map). In one example, the white spots may be obtained from a database of known wireless and cellular white spots. For example, cellular white spots including locations that do not have cellular data coverage may be from cellular companies providing cellular communication service (e.g., in the united states AT&T, Verizon, T-Mobile, etc.). In another example, the white spots may be determined empirically by the in-vehicle computing system and/or the mobile device monitoring wireless and cellular communication during travel.

Next, method 600 proceeds to 616. At 616, method 600 includes adjusting multimedia download parameters and cache size based on predicted and/or current user behavior and network properties. Details of adjusting a cache size and multimedia downloading parameters when the vehicle is connected to a network will be further elaborated with respect to FIG. 8. Subsequently, method 600 proceeds to 618. At 618, method 600 includes delivering multimedia content to the user. For example, multimedia content including audio and video content may be delivered to the user via one or more outputs from devices controlled by the in-vehicle computing system, such as via a display, one or more speakers, and/or one or more rear entertainment devices having a rear display(s). Method 600 may then return to 606 to continue monitoring the status of the vehicle computing system and the vehicle parameters/conditions.

Figure 7:
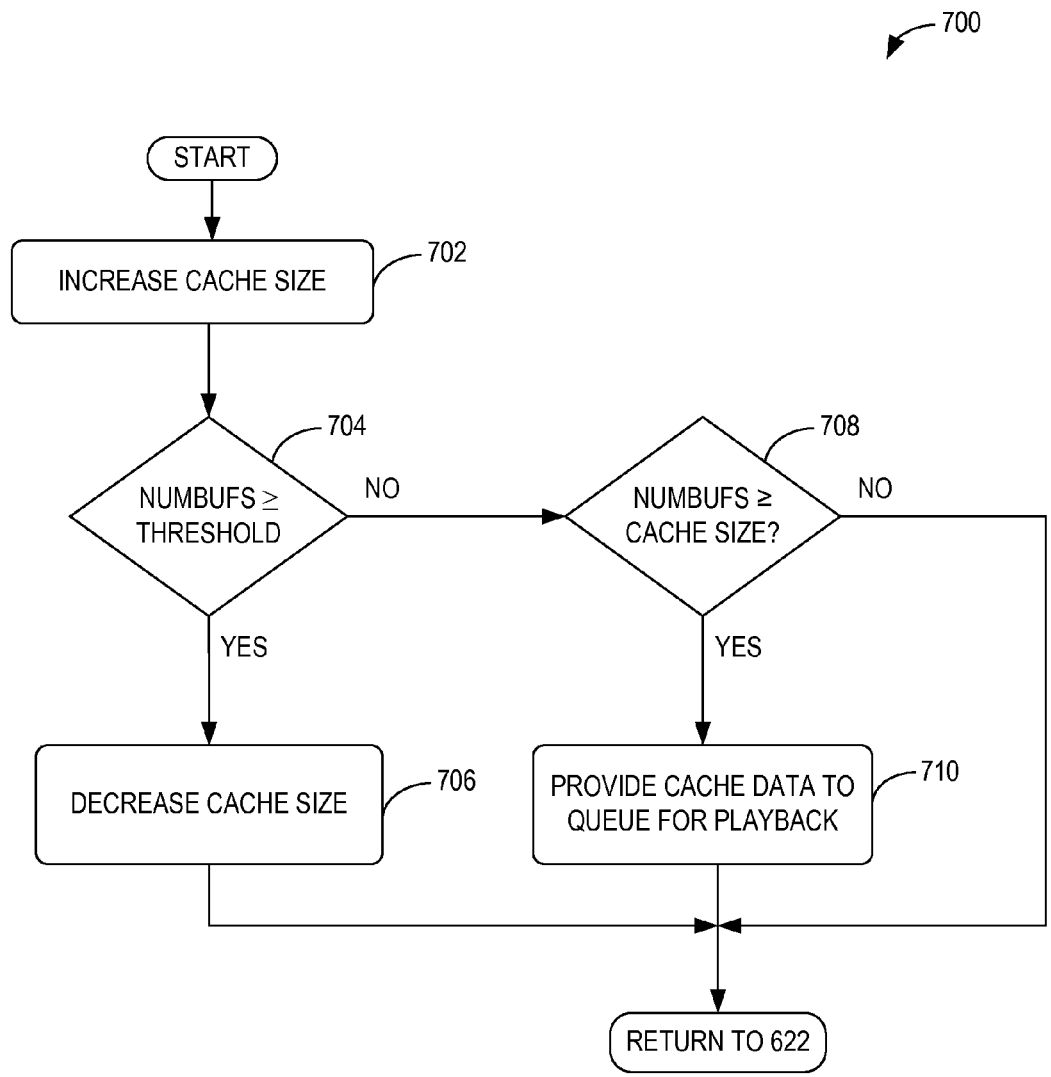
FIG. 7 shows a flow chart illustrating an example method for adaptive adjustment of playback cache memory when a communication channel is not available for downloading multimedia content in accordance with one or more embodiments of the present disclosure.

Turning to FIG. 7, a flowchart illustrating an example method 700 for adjusting playback cache when a communication network (also herein referred to as communication channel) is not available is shown. Method 700 may be operated in cooperation with method 600 of FIG. 6. Instructions for carrying out method 700 may be executed by an operating system processor, such as processor 334 at FIG. 3, based on instructions stored on a memory of the processor and in conjunction with signals received from sensors and/or control systems of the vehicle system, such as the sensors and control systems described above with reference to FIGS. 1-3.

At 702, method 700 includes increasing a cache size. For example, the cache size may be increased by increasing a number of buffers allocated to the cache memory of a data storage device within an in-vehicle computing system. In one example, the cache size may be increased when the wireless network is not available for more than one instance. For example, if the vehicle is travelling in a known route and it is determined that a number of white spots along the route is greater than a threshold, then when the communication channel is not available, the cache size may be increased. In other words, if a number of white spots along the route is greater than a threshold, the cache size may be increased whenever the vehicle enters a white spot boundary. Otherwise, the cache size may be maintained at an initialized value, for example. Further, in some examples, the cache size may be increased based on a duration of travel in the white spot. For example, the cache size may be increased by a greater value as the duration of travel within the white spot. The duration of travel within the white spot may be based on a vehicle speed, a white spot radius, etc. In some examples, the cache size may be increased by a greater value if a number of white spots along the known or the predicted route is greater than a second threshold number. In this way, by adaptively increasing the cache size based on availability of communication network, availability of cache memory for download during conditions when a wireless communication channel is available is improved, thereby facilitating continuous playback even when communication network is unavailable for downloading multimedia content. Further, the cache size may not exceed a certain value. For example, the cache size may not be increased above a higher threshold.

Next, at 704 method 700 includes confirming if a difference between a head INDEX and a tail INDEX of the cache (the difference is herein referred to as NUMBUFS) is greater than a threshold. For example, the cache may be logically configured as a circular buffer with a HEAD index that indicates where downloaded multimedia data should be stored, and a TAIL index indicates where the audio should start playing from. NUMBUFS is equal to the absolute value of the difference value (HEAD−TAIL). As known, whenever the HEAD and TAIL of a circular buffer meet on the same index, then the playback of audio stops abruptly. This may be a referred to a NO NETWORK condition. When the HEAD and TAIL are furthest apart (e.g., 128 if N is equal to 128) this may be referred to as a FULL NETWORK condition.

If the answer at 704 is YES, method 700 proceeds to 706. At 706, method 700 includes decreasing the cache size. An amount of decrease may be based on an expected number of white spots along the remainder of the travel route, for example. Accordingly, in one example, as the expected number of white spots along the rest of the travel route increases, the amount of decrease may be less. In another example, in addition to the number of white spots, the amount of decrease may be based on user behavior (e.g. user demand for multimedia data download based on expected listening pattern). Further, the cache size may not be decreased below a lower threshold. Upon decreasing the cache size, method 700 may return to 622.

If the answer at 704 is NO, method 700 proceeds to 708. At 708, method 700 includes confirming is NUMBUS is greater than a current cache size. If YES, method 700 proceeds to 710, where downloaded data is pushed from the cache into a queue. Upon delivering cache data into the queue for playback, method 700 returns to 622. In this way, when a wireless communication network is not available, cache size may be increased. By increasing the cache size, an increased amount of data may be downloaded when the wireless communications network becomes available.

Figure 8:
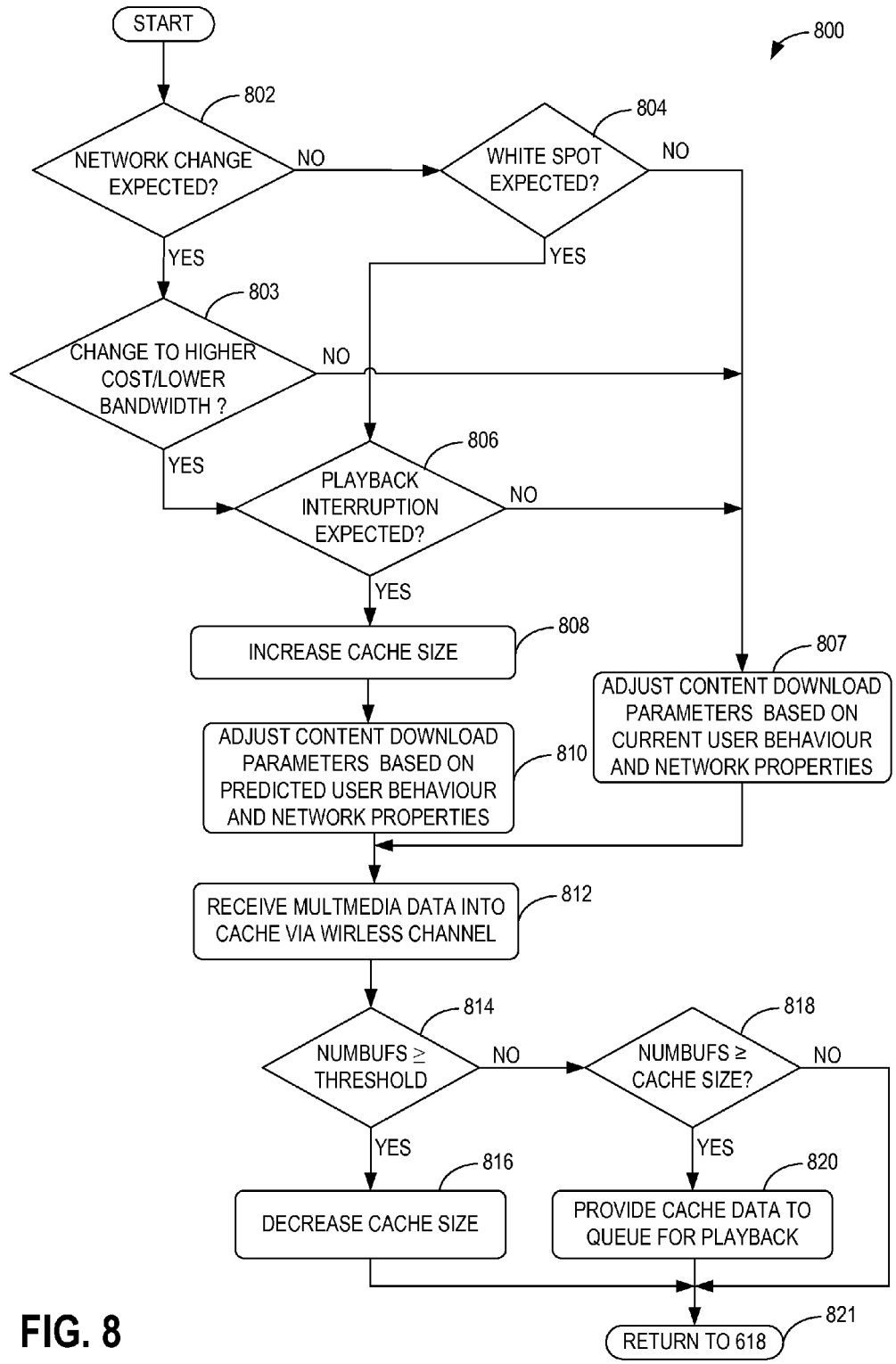
FIG. 8 shows a flow chart illustrating an example method for adaptive adjustment of playback cache memory in response to an expected network change in accordance with one or more embodiments of the present disclosure.

FIG. 8 shows a flowchart illustrating an example method 800 for adjusting multimedia download and playback cache based on predicted network behavior when a communication channel is available is shown. Method 800 may be operated in cooperation with method 600 of FIG. 6. Instructions for carrying out method 800 may be executed by an operating system processor, such as processor 334 at FIG. 3, based on instructions stored on a memory of the processor and in conjunction with signals received from sensors and/or control systems of the vehicle system, such as the sensors and control systems described above with reference to FIGS. 1-3.

At 802, method 800 includes determining if a change in a communication network that provides communication between the in-vehicle computing system and the external network is expected. For example, it may be determined if a communication network change is expected (e.g., from a first communication network to a second communication network) along a known travel route and/or predicted travel route. In one example, determining if a network change is expected may include determining if the change is expected within a threshold duration and/or a threshold distance from a current position along the known or predicted travel route.

Upon confirming network change (answer at 802 is YES), method 800 proceeds to 803. At 803, method 800 includes determining if one or more network parameters (e.g., bandwidth, signal strength, cost, etc.) are expected to change in response to the change in network. Specifically, it may be determined if a network change to a higher cost network and/or lower bandwidth network with respect to current network is expected. In some examples, the method may further include determining, responsive to the expected change, if a duration of vehicle operation in higher cost and/or lower bandwidth network may be greater than a threshold duration. If network change to a higher cost and/or lower bandwidth network is expected, method 800 proceeds to 806. Otherwise, method 800 proceeds to 807. At 807, method 800 includes adjusting multimedia download parameters based on current network properties.

Returning to 802, if a network change is not expected (answer at 802 is NO), method 800 proceeds to 804. At 804, method 800 includes determining if a white spot is expected along the travel route (known and/or predicted). For example, it may be determined if the vehicle may travel through white spot locations. As described above, the white spot locations may include locations that do not have cellular data coverage or locations where the wireless connectivity or wireless signal strength is below a threshold (−90 dBm, for example). In one example, determining if a white spot is expected may include determining if the white spot is expected within a threshold duration and/or a threshold distance from a current position along the known or predicted travel route.

If it is confirmed that a white spot is expected, method 800 proceeds to 806. If it is confirmed at 804 that a white spot is not expected along the travel route, method 800 proceeds to 807. At 807, method 800 includes maintaining current multimedia content download parameters (e.g., download speed, codec, etc.) based on current network parameters (bandwidth, cost, etc.). Specifically, if it is confirmed that no network change is expected and no white spot is expected along the travel route, a size of the play back cache may not be increased, and multimedia (audio/video) data may be downloaded from the external network based on current wireless communication network properties. Method 800 then proceeds to 812.

Returning to 806, method 800 includes to determining if a multimedia playback interruption is expected when the vehicle travels within the white spot or when the vehicle operates in the higher cost and/or lower bandwidth condition (due to network change). The determination of expected playback interruption may be based on current and/or predicted user behavior and current and/or predicted network parameters.

If playback interruption is not expected at 806, method 800 proceeds to 807 where multimedia content download parameters are adjusted based on current network properties as discussed above. In some examples, multimedia content download parameters may be additionally based on current user behavior.

If playback interruption is expected at 806 (due to the vehicle traveling in the white spot or due network change to a higher cost and/or lower bandwidth network), method 800 proceeds to 808. At 808, method 800 includes increasing a size of the cache. Upon increasing cache size, method 800 proceeds to 810. At 810, method 800 includes adjusting content download parameters based on predicted user behavior and predicted network properties. For example, if it is expected that sufficient multimedia content may not be available for playback when the vehicle travels within the white spot or when the vehicle operates in the higher cost and/or lower bandwidth condition even after increasing the cache size, a lower codec may be implemented along with increase in cache size so as to deliver multimedia content to the user with reduced interruption. That is, in order to maintain continuity of playback and increase an amount of multimedia content stored in the cache, a quality of multimedia content may be reduced.

Next, at 812, method 800 includes receiving multimedia data into cache. For example, the multimedia data from the external network that is downloaded via a current wireless network may be stored in the cache until it is delivered to a queue buffer for playback.

Upon storing multimedia data into cache, method 800 proceeds to 814. It may be noted that subsequent actions performed at 814, 816, 818, and 820 are similar to those performed at 704, 706, 708, and 710 described at FIG. 7. Accordingly, at 814 method 800 includes confirming if a difference between a head INDEX and a tail INDEX of the cache (NUMBUFS) is greater than a threshold. If the answer at 814 is YES, method 800 proceeds to 816. At 816, method 800 includes decreasing the cache size. Upon decreasing the cache size, method 800 may return to 618.

If the answer at 814 is NO, method 800 proceeds to 818. At 818, method 800 includes confirming if NUMBUS is greater than a current cache size. If YES, method 800 proceeds to 820, where the downloaded data that is stored in the cache is pushed from the cache into a queue. Upon delivering cache data into the queue for playback, method 800 returns to 618.

In this way, when a communication network is expected to change or become unavailable for downloading multimedia data from an external network, cache size may be increased. By increasing the cache size, an increased amount of data may be downloaded into the cache size and utilized for playback.

Figure 9:
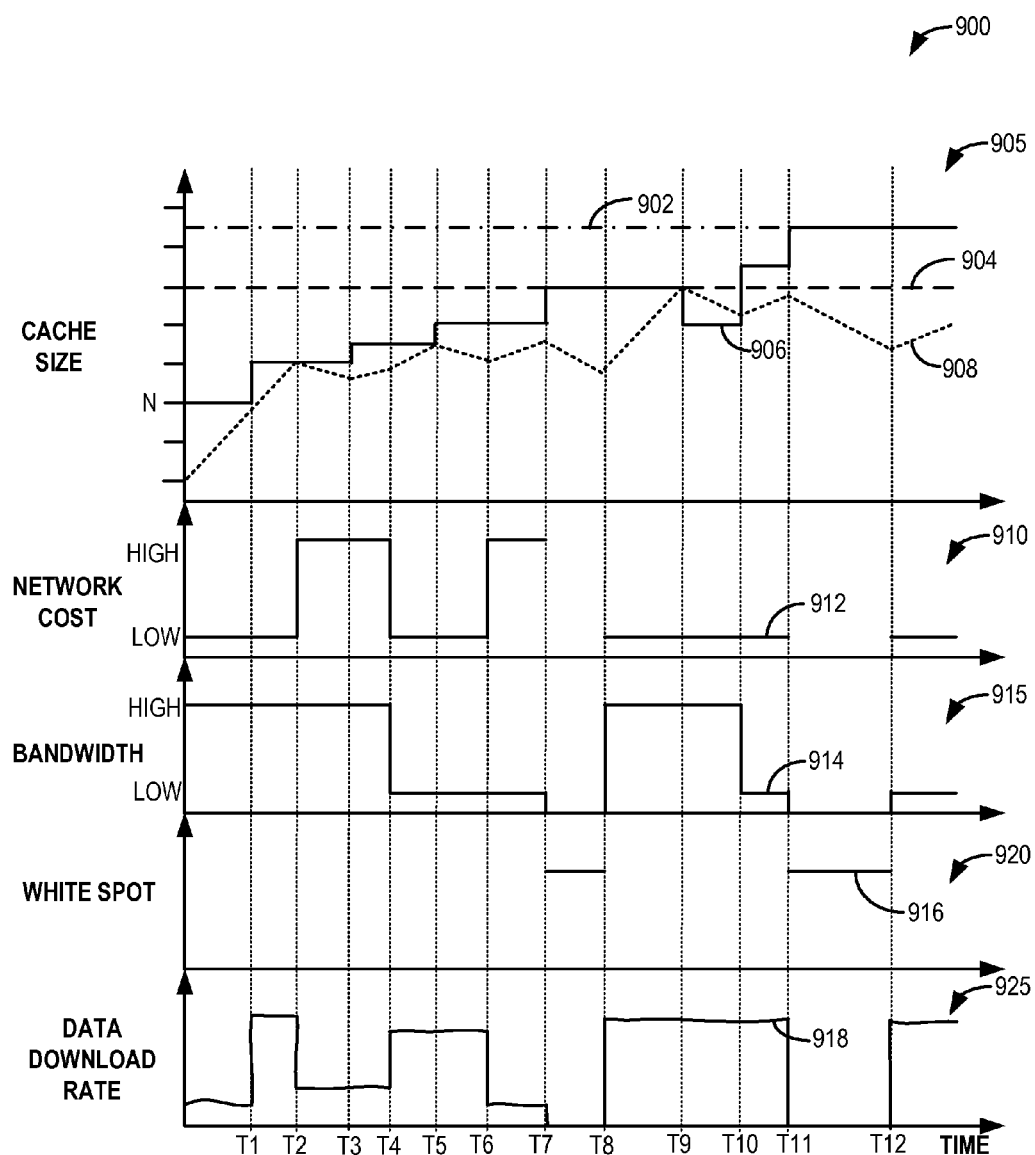
FIG. 9 shows an example adaptive adjustment of playback cache memory in accordance with one or more embodiments of the present disclosure.

FIG. 9 shows a map 900 illustrating an example timing sequence for dynamically adapting a size of a first playback cache of a data storage device included within an in-vehicle computing system (such as in-vehicle computing system 301 at FIG. 3) of a vehicle based on connectivity of the in-vehicle computing system with an external network (e.g., a remote multimedia data source) via a wireless communication network (e.g. cellular or local area wireless network) directly connected to the in-vehicle computing system when the vehicle is in motion. The vehicle may be traveling along a travel route, where the travel route is determined based on a destination input by a user. If a destination is not provided by the user, the travel route may be predicted based on current location, date, day, time of the day, and stored data indicating previous trips to determine a likely route.

In one example, a mobile device connected to the communication network and located within the vehicle may be utilized to connect the in-vehicle infotainment system with the external network. In such cases, multimedia data may be downloaded from the external network into a second playback cache of a second data storage device located within the mobile device. Further, a size of the second playback cache may be dynamically adapted based on connectivity of the mobile device with the wireless network (assuming stable connectivity between the in-vehicle computing system and the mobile device). Data from the second playback cache may then be pushed into a queue buffer of the in-vehicle infotainment system for playback. In another example, when the in-vehicle infotainment system is connected to the external network via the mobile device, the first playback cache size and the second playback cache size may be dynamically adapted simultaneously. In still another example, when the in-vehicle infotainment system is connected to the external network via the mobile device, either the first playback cache size or the second playback cache size may be dynamically adjusted based on whether the connectivity (or predicted connectivity) with the communication network is first detected/predicted by the in-vehicle computing system or the mobile device. For example, when the vehicle including the mobile device in motion, if the in-vehicle computing system detects that the vehicle is at a location within a threshold distance (or duration) from a white spot prior to the mobile device detecting the same, the first playback cache size of the in-vehicle computing system may be adjusted.

Map 900 includes plot 905 representing a cache memory size along the Y-axis versus time along X-axis. The cache memory size increases along direction of Y-axis arrow. Plot 905 includes trace 906 indicating adjustment of cache size over time along a travel route of the vehicle. Plot 905 further includes trace 908 indicating amount of multimedia content available for playback in the cache over time. Horizontal line 902 indicates an upper threshold for cache memory size, and horizontal line 904 indicates a threshold amount for content in cache, at or above which content may be pushed to a queue buffer for playback.

Map 900 further includes plot 910 representing network cost along the Y-axis versus time along X-axis. The network cost increases along direction of Y-axis arrow. Plot 910 includes trace 912 indicating change in network cost over time along the travel route. Map 900 further includes plot 915 representing wireless communication bandwidth along the Y-axis versus time along X-axis. The wireless communication bandwidth increases along direction of Y-axis arrow. Plot 915 includes trace 914 indicating change in bandwidth over time along the travel route.

Map 900 further includes plot 920 representing presence of white spot along the Y-axis versus time along X-axis. Plot 920 includes trace 916 indicating presence of white spots over time along the travel route. Map 900 further includes plot 925 representing data download rate along the Y-axis versus time along X-axis. The data download rate increases along direction of Y-axis arrow. Plot 925 includes trace 918 indicating change in data download rate over time along the travel route.

At time T0, the vehicle may be operating with the in-vehicle computing system communicating with the external network via a first wireless communication network. Further, the first playback cache size of the in-vehicle computing system may be at an initialized value N (906). The first playback cache may be configured as a circular buffer including a HEAD index that indicates where the downloaded multimedia data may be stored, and a TAIL index that indicates from which memory location in the playback cache the stored data may be pushed to a queue buffer. Accordingly, an absolute difference between the HEAD index and the TAIL index (NUMBUFS) indicates a number of buffers in the first playback cache filled with multimedia content (908) that may be pushed to the queue buffer for playback. At time T0, NUMBUFS may be at N−4. Thus, at time T0, the first playback cache size (N) is greater than a value of NUMBUFS. Therefore, multimedia data from the first playback cache may not be pushed to queue buffer. However, queue buffer may contain multimedia data (that was previously pushed from the first playback cache) which may be delivered to the user. For example, multimedia containing audio and/or video data may be delivered to the user via one or more audio/video interfaces included in the vehicle. Between T0 and T1, the in-vehicle computing system may download multimedia data into the first playback cache. However, the first playback cache size (N) may be greater than NUMBUFS. Therefore, data from the first cache may not be delivered to the queue. Consequently, NUMBUFS increases but continues to remain less than the first playback cache size.

At time T1, the vehicle may have traveled a distance d1 from T0 and may enter a location that is within a threshold duration from an expected network change location. Thus, at T1, the in-vehicle computing system may detect that the vehicle is at a location within the threshold duration. The first expected network change may be a change to a higher network cost (912). Therefore, in response to the detection, the in-vehicle computing system may increase the size of the cache. Further, in some examples, the in-vehicle computer system may increase a download rate (918) to a higher rate that is permissible within the current network bandwidth in response to detecting the expected network change within the threshold duration and/or distance along the travel route. Additionally or alternatively, a lower codec may be implemented during the download in order to increase the amount of data downloaded prior to the expected network change. Between T1 and T2, multimedia data may continue to be downloaded into the first playback cache.

Next, at T2, a network change from to a higher cost network may occur. However, a bandwidth (914) may remain the same. Further at T2, NUMBUFS may be equal to the first playback cache size. Therefore, downloaded data stored in the playback cache may be pushed to the queue buffer. At T2, and between T2 and T3, the in-vehicle computing system may continue to download multimedia data from the internet, however, the download rate may be adjusted (decreased) so as to maintain cost within a threshold. In some examples, if the network cost is greater than a threshold cost, multimedia data may not be downloaded while the vehicle is operating in the higher cost network. However, since the network change to the higher cost network was predicted prior to the actual network change and the cache size was increased, sufficient data may be stored in the cache for continuous playback even when the vehicle operates in the higher cost network.

At T3, the in-vehicle computing system may detect a second expected network change. The second expected network change may be a network change from a higher bandwidth network to a lower bandwidth network (914), and the network cost may change from a higher cost network to a lower cost network (912). In response to detecting the expected network change, the in-vehicle computing system may increase the size of the playback cache. The amount of increase may be based on an expected duration of travel in the lower bandwidth network. For example, as the expected duration of travel in the lower bandwidth network increases, the playback cache size may be increased by a greater amount. In some examples, the amount of increase may be additionally based on current user demand for multimedia download, predicted user demand for multimedia download when operating within the changed network, and cost of multimedia download in the changed network.

At T4, the wireless communication network may change. Accordingly, at T4 and between T4 and T5, the data download rate may be based on one or more network properties (e.g., cost and bandwidth) as discussed above. At T5, the in-vehicle computing system may detect a third expected network change to a higher cost network within a threshold distance/duration. Accordingly, the size of the playback cache may be increased. Next, at T6, the in-vehicle computing system may detect that the vehicle may be expected to operate within a wireless white spot boundary for a first white spot duration. Accordingly, the in-vehicle computing system may increase a cache size at T6 prior to entering the white spot location. As a result, an amount of multimedia data stored in the cache may be increased, which may be subsequently pushed to the queue buffer and utilized for playback when the vehicle travels through the white spot. Consequently, continuous playback of multimedia data may be achieved even when a wireless communication network is not available. In some examples, in addition to increasing the size of the playback cache, a size of the queue buffer may be increased prior to entering the white spot location.

At T7, the vehicle may enter the wireless white spot boundary (916). Consequently, the in-vehicle computing system may not be connected to a wireless network. In response to determining that a connection to a wireless network is not available, the in-vehicle computing system may increase the size of the cache. Further, when the vehicle is traveling within the white spot boundary, stored multimedia data from the cache may be pushed to the queue buffer for playback. In some examples, when a wireless communication network is not available, the size of the cache may be increased only when the vehicle remains within the white spot radius for a threshold duration of time. In some other examples, if it is determined that more than one white spot radius is expected along the travel route, the cache size may be increased at each white spot until a threshold cache size is reached or until NUMBUFS reaches the threshold value (904).

At T8, a wireless network connection may be available. Accordingly, the in-vehicle computing system may be connected to the wireless communication network. Therefore, at T8, and between T8 and T9, multimedia data may be downloaded from external network into the playback cache via the wireless communication network that is currently connected to the in-vehicle computing system. At T9, NUMBUFS may reach the threshold value (904). Therefore, at T9, the size of the playback cache (906) may be decreased. Further, at T9, and between T9 and T10, NUMBUFS (908) may be greater than the size of the playback cache (906). Therefore, data may be pushed from the playback cache to the queue in order to increase availability of memory in the playback cache for downloading multimedia content. Simultaneously, at T9 and between T9 and T10, multimedia data may be downloaded from the external network via the wireless communication network and stored in the playback cache.

At T10, the in-vehicle computing system may determine that a second white spot radius may be expected along the travel route. The second white spot radius may be greater than the first white spot radius. Therefore, at T10, the in-vehicle computing system may increase the size of the playback cache prior to the vehicle entering the second white spot radius. As mentioned earlier, in addition to increasing the size of the playback cache, a size of the queue buffer may be increased prior to entering the white spot location. The amount of increase of the cache size may be based on a duration of travel within the white spot radius. For example, as the duration of travel within the white spot increases, the amount of increase may be greater.

At T11, the vehicle may enter the second white spot radius. Therefore, the playback cache size may be increased. Further at T11, the cache size may reach a threshold (902). At T11, and between T11 and T12, when the vehicle is operating within the white spot radius, multimedia data stored in the cache may be utilized for playback, thereby providing uninterrupted multimedia experience along the travel route.

While the above example indicates determining expected network change and/or expected white spot along the travel route as the vehicle is travelling, in some examples, the network changes and the expected white spots may be determined at the start of travel route (predicted or known). Accordingly, whenever the vehicle is at a threshold duration and/or distance from the expected network change location or white spot location, cache size may be adjusted (increased or decreased or maintained) as discussed above. Further, by determining the expected network changes and white spots at the start of the travel route, information regarding potential network changes and white spots are available even when the vehicle travels within a white spot boundary. Thus, reliance on network connectivity for determining expected network change or white spot when travelling within white spots is reduced.

The systems and methods described above also provide for an in-vehicle computing system that adaptively caches multimedia data, the system comprising a memory; a position sensor that provides a position signal indicative of a present location of the system; a receiver that wirelessly receives multimedia data from a remote multimedia data source; a processor that stores the received multimedia data in the memory, transfers multimedia data in the memory to a queue for playback when an amount of multimedia data saved in the memory is at least a first threshold value and adjusts a size of the memory when a wireless communication channel is not available between the system and a remote multimedia data source. In a first example of the in-vehicle computing system, adjusting the size of the memory may additionally or alternatively includes wherein the first threshold value based on the adjusted size of the memory; and wherein the processor increases the size of the memory by a first amount responsive to detecting, each of a plurality of adjacent sample times, that wireless communication is not available between the system and the remote multimedia data source. A second example of the in-vehicle computing system optionally includes the first example and further includes wherein the processor decreases the size of the memory by a second amount when a wireless communication channel is available between the system and the remote multimedia data source. A third example of the in-vehicle computing system optionally includes one or more of the first and the second examples, and further includes wherein the memory is a cache memory; and wherein the cache memory comprises a circular buffer with a head index that indicates where the received multimedia data is to be stored and a tail index that indicates where transfer of the stored multimedia data in the cache memory to the queue for playback is to start. A fourth example of the in-vehicle computing system optionally includes one or more of the first through the third examples, and further includes where the cache memory, the position sensor, the receiver and the processor are each located in a smart phone within the vehicle. A fifth example of the in-vehicle computing system optionally includes one or more of the first through the fourth examples, and further includes where the cache memory, the position sensor, the receiver and the processor are each located motor vehicle head unit. A sixth example of the in-vehicle computing system optionally includes one or more of the first through the fifth examples, and further includes where the cache memory, the position sensor, the receiver and the processor are distributed between a motor vehicle head unit and smart phone. A seventh example of the in-vehicle computing system optionally includes one or more of the first through the sixth examples, and further includes wherein the processor monitors the receiver to determine when the system is not in communication with a wireless communication channel and to provide white spot position information indicative of the system location when the system is not in communication with a wireless communication channel. An eighth example of the in-vehicle computing system optionally includes one or more of the first through the seventh examples, and further comprises a transmitter that wirelessly transmits the system location and where processor increases the size of the cache memory by a first amount a second time when a wireless communication channel is still not available between the system and the remote multimedia data source. A ninth example of the in-vehicle computing system optionally includes one or more of the first through the eighth examples, and further includes where the cache memory, position sensor, receiver and processor are each located in a smart phone, and transmitter also within the smart phone wirelessly transmits the system location.

The systems and methods described above also provide for a method for adaptively caching multimedia data, comprising wirelessly receiving multimedia data from a remote multimedia data source via a communication network; storing the received multimedia data in a memory of a data storage device included in an in-vehicle computing system of a vehicle; transferring the stored multimedia data in the memory to a queue for playback when an amount of the stored multimedia data is at least a first threshold value, the first threshold value based on a size of the memory; increasing the size of the memory by a first amount when a wireless communication channel is not available; maintaining the memory at the increased size when the wireless communication channel is subsequently available and if the amount of stored multimedia data is less than a second threshold value, the second threshold value greater than or equal to the first threshold value; and decreasing the size by a second amount when the amount of stored multimedia data is at the second threshold value. In a first example of the method, when the wireless communication is not available, the method may additionally or alternatively include determining a present location of the vehicle and providing a position signal indicative thereof. A second example of the method optionally includes the first example, and further comprises adjusting the size of the memory in response to expecting a change in one or more parameters of the communication network occurring within a threshold duration, the one or more parameters including a bandwidth of the communication network and a cost of the communication network; and further includes wherein the adjusting is based on a weightage assigned to each of the one or more parameters; and wherein the memory is a cache memory.

The systems and methods described above also provide for an in-vehicle infotainment system comprising a data storage device including a memory configured to receive multimedia content from an external network via a first communication network; a queue memory configured to receive multimedia data from the memory and deliver the received multimedia data to a user via one or more output devices; a transceiver configured to communicate with a mobile device, the mobile device communicating with the first communication network; one or more sensors; a user input interface configured to receive user input from one or more user input devices; and a processor storing instructions executable by the processor to determine a current location based on output from the one or more sensors; determine a travel route based on a destination input from a user via the one or more input devices; determine a number of white spots along the travel route; determine expected communication network changes along the travel route; in response to a first duration before an expected communication network change reaching below a threshold duration, increasing a size of the memory by a first amount; in response to a second duration before arriving at a white spot location reaching below the threshold duration, increasing the size by a second amount, the second amount greater than the first amount; and in response to a number of buffers of the memory increasing above a threshold number, decreasing the first size by a third amount. In a first example of the in-vehicle infotainment system, increasing or decreasing the size additionally or alternatively includes wherein the memory is configured to receive multimedia data directly from the first communication network. A second example of the in-vehicle infotainment system optionally includes the first example and further includes wherein the white spots include regions having cellular network coverage below a threshold. A third example of the in-vehicle infotainment system optionally includes one or more of the first and the second examples and further includes wherein the expected communication network change includes changing from the first communication network to a second communication network, the second communication network having a lower bandwidth than the first communication network. A fourth example of the in-vehicle infotainment system optionally includes one or more of the first through the third examples, and further includes wherein the expected communication network change includes changing from the first communication network to a second communication network, the second communication network having a higher network charge rate than the first communication network. A fifth example of the in-vehicle infotainment system optionally includes one or more of the first through the fourth examples, and further includes wherein the memory is configured to receive multimedia content from the external network via the mobile device connected to the first communication network. A sixth example of the in-vehicle infotainment system optionally includes one or more of the first through the fifth examples, and further includes wherein the mobile device includes a second memory for receiving multimedia data from the first communication network; and wherein the processor further includes instructions executable by the processor for: in response to the first duration before the expected communication network change reaching below the threshold duration, increasing a second size of the second memory by the first amount; and in response to the second duration before arriving at the white spot location reaching below the threshold duration, increasing the second size by the second amount. A seventh example of the in-vehicle infotainment system optionally includes one or more of the first through the sixth examples, and further includes wherein each of the memory and the second memory is a cache memory; and wherein the processor further includes instructions executable by the processor for: in response to arriving at the white spot location and remaining within a boundary of the white spot for a duration greater than a threshold, increasing the size by a fourth amount, the fourth amount based on an expected duration of travel within the boundary of the white spot.

The systems and methods described above also provide for a system that adaptively caches multimedia data, the system comprising a memory; a position sensor that determines a present location of the system and provides a position signal indicative thereof; a receiver that wirelessly receives multimedia data and provides received multimedia data; and a processor that stores the received multimedia data in the memory, transfers multimedia data in the memory to a queue for playback when an amount of multimedia data saved in the memory is at least a first threshold value, where the processor increases the first value by a first amount when a wireless communication channel is not available between the system and a remote multimedia data source. In a first example of the system, when the wireless communication channel is not available, the system additionally or alternatively includes wherein the processor increases the first value by the first amount responsive to detecting, each of a plurality of adjacent sample times, that wireless communication is not available between the system and the remote multimedia data source. A second example of the system optionally includes the first example and further includes wherein the processor decreases the first value by a second amount when a wireless communication channel is available between the system and the remote multimedia data source. A third example of the system optionally includes one or more of the first and the second examples, and further includes wherein the memory is a cache memory; and wherein the cache memory comprises a circular buffer with a head index that indicates where the received multimedia data is to be stored and a tail index that indicates where transfer of the stored multimedia data in the cache memory to the queue for playback is to start. A fourth example of the system optionally includes one or more of the first through the third examples, and further includes wherein the cache memory, position sensor, receiver and processor are each located in a smart phone. A fifth example of the system optionally includes one or more of the first through the fourth examples, and further includes wherein the cache memory, position sensor, receiver and processor are each located motor vehicle head unit. A sixth example of the navigation system optionally includes one or more of the first through the fifth examples, and further includes wherein the cache memory, position sensor, receiver and processor are distributed between a motor vehicle head unit and smart phone. A seventh example of the system optionally includes one or more of the first through the sixth examples, and further includes wherein the processor monitors the receiver to determine when the system is not in communication with a wireless communication channel and to provide white spot position information indicative of a system location when the system is not in communication with a wireless communication channel. An eighth example of the system optionally includes one or more of the first through the seventh examples, and further comprises a transmitter that wirelessly transmits the system location and where processor increases the first value by a first amount a second time when a wireless communication channel is still not available between the system and the remote multimedia data source. An ninth example of the system optionally includes one or more of the first through the eighth examples, and further included where the cache memory, position sensor, receiver and processor are each located in a smart phone, and transmitter also within the smart phone wirelessly transmits the system location.

Although the invention has been illustrated and described with respect to several preferred embodiments thereof, various changes, omissions and additions to the form and detail thereof, may be made therein, without departing from the spirit and scope of the invention. The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109/200/301/404/504 described with reference to FIGS. 1-5. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and subcombinations of the various systems and configurations, and other features, functions, and/or properties disclosed.

The invention claimed is:

1. An in-vehicle computing system that adaptively caches multimedia data, the in-vehicle system comprising:
   a memory;
   a position sensor that provides a position signal indicative of a present location of the system;
   a receiver that wirelessly receives multimedia data from a remote multimedia data source; and
   a processor that stores the received multimedia data in the memory, transfers multimedia data in the memory to a queue for playback when an amount of multimedia data saved in the memory is at least a first threshold value and adjusts a size of the memory when a wireless communication channel is not available between the system and the remote multimedia data source;
   increases the size of the memory by a first amount when the wireless communication channel is not available;
   maintains the memory at the increased size when the wireless communication channel is subsequently available and if the amount of stored multimedia data is less than a second threshold value, the second threshold value being greater than or equal to the first threshold value; and
   decreases the size of the memory by a second amount when the amount of stored multimedia data is at the second threshold value.

2. The system of claim 1, wherein the first threshold value is based on the adjusted size of the memory; and wherein the processor increases the size of the memory by a first amount responsive to detecting each of a plurality of adjacent sample times that wireless communication is not available between the system and the remote multimedia data source.

3. The system of claim 2, wherein the processor decreases the size of the memory by a second amount when a wireless communication channel is available between the system and the remote multimedia data source.

4. The system of claim 1, wherein the memory is a cache memory; and wherein the cache memory comprises a circular buffer with a head index that indicates where the received multimedia data is to be stored and a tail index that indicates where transfer of the stored multimedia data in the cache memory to the queue for playback is to start.

5. The system of claim 1, where the memory, the position sensor, the receiver and the processor are each located in a smart phone within a vehicle.

6. The system of claim 1, where the memory, the position sensor, the receiver and the processor are each located in a motor vehicle head unit.

7. The system of claim 1, where the memory, the position sensor, the receiver and the processor are distributed between a motor vehicle head unit and a smart phone.

8. The system of claim 1, wherein the processor monitors the receiver to determine when the system is not in communication with a wireless communication channel and to provide white spot position information indicative of the present location when the system is not in communication with a wireless communication channel.

9. The system of claim 1, further comprising a transmitter that wirelessly transmits the present location and where the processor increases the size of the memory by a first amount a second time when a wireless communication channel is still not available between the system and the remote multimedia data source.

10. The system of claim 9, where the memory, the position sensor, the receiver and the processor are each located in a smart phone, and a transmitter also within the smart phone wirelessly transmits the system location.

11. A method for adaptively caching multimedia data, the method comprising:
    wirelessly receiving multimedia data from a remote multimedia data source via a communication network;
    storing the received multimedia data in a memory of a data storage device included in an in-vehicle computing system of a vehicle;
    transferring the stored multimedia data in the memory to a queue for playback when an amount of the stored multimedia data is at least a first threshold value, the first threshold value based on a size of the memory, increasing the size of the memory by a first amount when a wireless communication channel is not available;
    maintaining the memory at the increased size when the wireless communication channel is subsequently available and if the amount of stored multimedia data is less than a second threshold value, the second threshold value being greater than or equal to the first threshold value; and
    decreasing the size of the memory by a second amount when the amount of stored multimedia data is at the second threshold value.

12. The method of claim 11, further comprising determining a present location of the vehicle and providing a position signal indicative thereof.

13. The method of claim 11, further comprising adjusting the size of the memory in response to expecting a change in one or more parameters of the communication network occurring within a threshold duration, the one or more parameters including a bandwidth of the communication network and a cost of the communication network; wherein the size of the memory is based on a weight assigned to each of the one or more parameters; and wherein the memory is a cache memory.

* * * * *